United States Patent
Kaltenbach et al.

(10) Patent No.: US 9,376,115 B2
(45) Date of Patent: Jun. 28, 2016

(54) METHOD FOR CONTROLLING A TWO-SPEED TRANSMISSION WITH ELECTRIC MOTOR

(71) Applicant: ZF Friedrichshafen AG, Friedrichshafen (DE)

(72) Inventors: Johannes Kaltenbach, Friedrichshafen (DE); Kai Borntrager, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/607,296

(22) Filed: Jan. 28, 2015

(65) Prior Publication Data
US 2015/0224994 A1    Aug. 13, 2015

(30) Foreign Application Priority Data
Feb. 7, 2014  (DE) .......................... 10 2014 202 227

(51) Int. Cl.
| | |
|---|---|
| *B60K 1/02* | (2006.01) |
| *B60W 30/19* | (2012.01) |
| *B60W 10/08* | (2006.01) |
| *B60W 10/11* | (2012.01) |
| *B60W 30/188* | (2012.01) |
| *B60W 50/14* | (2012.01) |

(Continued)

(52) U.S. Cl.
CPC ............ *B60W 30/19* (2013.01); *B60L 15/2009* (2013.01); *B60L 15/2054* (2013.01); *B60W 10/08* (2013.01); *B60W 10/11* (2013.01); *B60W 30/188* (2013.01); *B60W 30/1884* (2013.01); *B60W 50/10* (2013.01); *B60W 50/14* (2013.01); *B60L 2240/12* (2013.01); *B60L 2240/421* (2013.01); *B60L 2240/423* (2013.01); *B60L 2250/10* (2013.01); *B60L 2250/26* (2013.01); *B60W 2540/10* (2013.01); *B60W 2540/12* (2013.01); *B60W 2710/083* (2013.01); *B60W 2710/1005* (2013.01); *B60W 2720/10* (2013.01); *B60Y 2200/91* (2013.01); *Y02T 10/7275* (2013.01); *Y10T 477/347* (2015.01)

(58) Field of Classification Search
None
See application file for complete search history.

(56) References Cited

U.S. PATENT DOCUMENTS

| | | | | |
|---|---|---|---|---|
| 5,150,681 | A | * | 9/1992 | Kull ......................... B60Q 1/44 |
| | | | | 123/198 D |
| 5,720,690 | A | * | 2/1998 | Hara ........................ B60K 6/48 |
| | | | | 180/65.25 |
| 5,730,675 | A | * | 3/1998 | Yamaguchi ............ B60K 6/365 |
| | | | | 192/218 |

(Continued)

FOREIGN PATENT DOCUMENTS

| | | | |
|---|---|---|---|
| DE | 10 2007 052 638 A1 | | 6/2008 |
| DE | 10 2010 024 147 A1 | | 1/2011 |

(Continued)

OTHER PUBLICATIONS

German Search Report Corresponding to 10 2014 202 227.4 mailed Sep. 19, 2014.

*Primary Examiner* — Dirk Wright

(74) *Attorney, Agent, or Firm* — David & Bujold, P.L.L.C.; Michael J. Bujold

(57) ABSTRACT

A method for the control of a two-speed transmission with an electric machine in a vehicle that is operating in overdrive. The motor torque (M) produced by the electric machine is at first controlled independently of a driver's indication (F) in such manner that an approximately constant vehicle speed is reached.

11 Claims, 1 Drawing Sheet

(51) Int. Cl.
*B60W 50/10* (2012.01)
*B60L 15/20* (2006.01)

(56) References Cited

U.S. PATENT DOCUMENTS

| | | | | |
|---|---|---|---|---|
| 5,903,061 | A * | 5/1999 | Tsuzuki | B60W 10/06 290/40 A |
| 5,905,349 | A * | 5/1999 | Farkas | B60L 7/18 318/139 |
| 6,155,365 | A * | 12/2000 | Boberg | B60K 6/48 180/65.25 |
| 6,328,672 | B1 * | 12/2001 | Eguchi | B60K 6/485 477/114 |
| 6,719,076 | B1 * | 4/2004 | Tabata | B60K 31/00 180/65.7 |
| 7,383,115 | B2 * | 6/2008 | Tabata | B60K 6/48 342/70 |
| 7,463,962 | B2 * | 12/2008 | Brunemann | B60K 6/48 180/65.7 |
| 7,848,867 | B2 * | 12/2010 | Ueno | B60K 6/48 180/65.21 |
| 7,894,968 | B2 * | 2/2011 | Stroh | B60W 10/06 303/141 |
| 8,038,572 | B2 * | 10/2011 | Matsubara | B60K 6/40 477/3 |
| 8,258,727 | B2 * | 9/2012 | Dunn | B60T 1/10 318/139 |
| 8,430,792 | B2 | 4/2013 | Noll | |
| 8,454,473 | B2 | 6/2013 | Reitz | |
| 8,554,419 | B2 * | 10/2013 | Crombez | B60T 7/042 180/282 |
| 8,565,987 | B2 | 10/2013 | Matsunaga et al. | |
| 8,694,188 | B2 * | 4/2014 | Miyamoto | B60L 3/00 701/22 |
| 8,788,177 | B2 * | 7/2014 | Hashimoto | B60W 30/18 477/182 |
| 8,814,749 | B2 * | 8/2014 | Tanaka | B60W 20/00 477/110 |
| 8,961,370 | B2 * | 2/2015 | Kida | B60K 28/16 477/185 |
| 2005/0046272 | A1 * | 3/2005 | Rieth | B60T 7/042 303/113.4 |
| 2014/0324264 | A1 * | 10/2014 | Hashimoto | B60K 6/445 701/22 |

FOREIGN PATENT DOCUMENTS

| | | |
|---|---|---|
| DE | 11 2009 001 997 T5 | 4/2012 |
| DE | 10 2012 013 501 A1 | 1/2014 |
| GB | 1 512 106 | 5/1978 |
| JP | H09-264414 A | 10/1997 |

* cited by examiner

METHOD FOR CONTROLLING A TWO-SPEED TRANSMISSION WITH ELECTRIC MOTOR This application claims priority from German patent application serial no. 10 2014 202 227.4 filed Feb. 7, 2014.

FIELD OF THE INVENTION

The present invention concerns a method for controlling a two-speed transmission with an electric motor.

BACKGROUND OF THE INVENTION

For example, from the document DE 10 2010 024 147 a two-speed transmission and a method for controlling a two-speed transmission are known. The transmission, which can be partially power shifted with an electric drive input, comprises a friction clutch and an interlocking clutch. Because of these, an overdrive upshift from the first gear to the second gear and an overdrive downshift from the second to the first gear cannot be carried out as power shifts.

During an overdrive shift, the vehicle is in overdrive operation and consequently the vehicle is being braked by the electric machine and recuperation is taking place. For example when driving downhill, despite the negative motor torque of the electric machine the vehicle's speed can increase. To avoid exceeding a specified maximum rotational speed of the electric machine, for example a 1-2 overdrive upshift is required. However, in this situation the traction-force-interrupted gearshift has the disadvantage that due to the sudden acceleration the driver is taken by surprise, which has a comfort-reducing effect. To prevent this, during the shifting process, the service brake can be actuated so that the vehicle does not accelerate during the shifting process. This, however, has the disadvantage of requiring elaborate control measures since the electric machine and the service brake have to be precisely coordinated with one another.

SUMMARY OF THE INVENTION

The purpose of the present invention is to propose a method of the type described to begin with, by virtue of which overdrive upshifts, in particular, are avoided or carried out more comfortably.

This objective is achieved by the characteristics specified in the description and the drawings.

Thus, a method is proposed for the control of a two-speed transmission with an electric machine in a vehicle, wherein a negative motor torque (M) applied by the electric machine is first controlled independently of any indication from the driver in such manner that an approximately constant driving speed is reached during overdrive operation. In this way comfort-reducing overdrive upshifts can be prevented, at least to begin with.

When the vehicle is in overdrive operation, for example while driving downhill, the electric machine produces negative torque or overdrive torque, for example by virtue of recuperation. In the method according to the invention the specification or control of the overdrive torque at the electric machine at first takes place independently of any driver's indication, in order to prevent the vehicle's driving speed from increasing any more and therefore to keep the speed approximately constant despite the overdrive operation. The driving speed of the vehicle can be recognized or detected, for example, from the gradient of the drive output rotational speed.

Accordingly, in an advantageous manner the reaching of an unpermitted maximum rotational speed by the electric machine is prevented. If the driver's indication changes and the driver wants a still larger overdrive torque, that wish is complied with. By virtue thereof, at least at first, a 1-2 overdrive upshift is avoided in the context of the proposed method. Among other things this has the advantage of reducing the frequency of gearshifts.

By virtue of the control strategy according to the invention, the initiation of a traction-force-interrupted 1-2 overdrive upshift is shifted to the driving range in which the driver himself expresses the wish to increase of the vehicle's speed. This is used as the trigger for the aforesaid gearshift, so that in this driving situation the shift does not take place unexpectedly.

If the driver's indication changes and the driver wants a smaller overdrive torque or even a positive drive torque, the 1-2 overdrive upshift is carried out with traction force interruption. The shift, with the concomitant interruption of the, in this case, negative traction force, is now not unexpected by the driver since he has called for a smaller braking torque or a desired positive torque.

The corresponding driver's indication can be given in that the driver first actuates the brake pedal and then actuates it less heavily. That driver action triggers the 1-2 overdrive upshift.

When as a driver's indication the driver first actuates the brake pedal and then relaxes it, the 1-2 overdrive upshift is again triggered. The particular advantage of this is that the traction force interruption takes place as a normal vehicle reaction since the braking torque disappears. When, as the driver's indication, it is detected that the driver has not at first actuated the brake pedal but then begins actuating the brake pedal, the 1-2 overdrive upshift is also triggered.

As a safety function, in the context of the present method it can be provided that when the maximum possible thrust torque and the maximum rotational speed of the electric machine have been reached, the 1-2 overdrive upshift is triggered but the driver is warned of this in advance. For example, the warning can be in the form of an acoustic signal so that the startling effect upon the driver is avoided.

BRIEF DESCRIPTION OF THE DRAWINGS

Below, the present invention is explained in more detail with reference to the figures, which show.

DETAILED DESCRIPTION OF THE PREFERRED EMBODIMENTS

Figure 1:
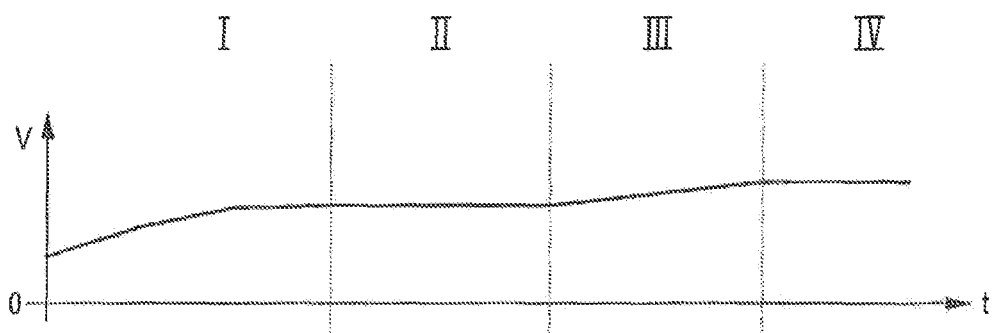
FIG. 1: A diagram showing the vehicle's speed as a function of time while driving downhill with a vehicle operating in overdrive.
Figure 2:
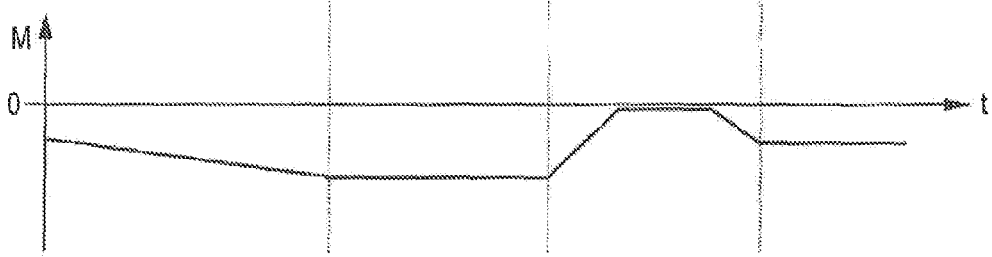
FIG. 2: A diagram showing the torque produced by the electric machine while driving downhill with a vehicle operating in overdrive.
Figure 3:
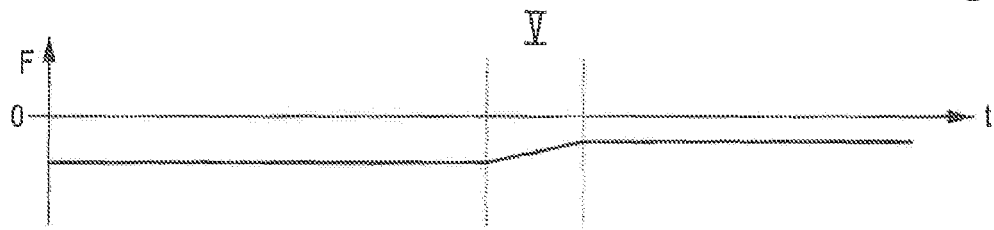
FIG. 3: A diagram showing the driver's indication as a function of time while driving downhill with a vehicle operating in overdrive.

FIGS. 1 to 3 show the control strategy according to the proposed method with reference to a vehicle operating in overdrive, the vehicle having a two-speed transmission with an electric machine as its drive input, wherein to carry out shifting processes the transmission comprises an interlocking clutch and a friction clutch. Because of this, the transmission can only be partially power shifted. Compared with fully power shiftable transmission systems having two power shift elements, this has the advantage of less structural complexity and lower drag losses. As an example, the control strategy for avoiding overdrive upshifts or for carrying them out comfortably, is shown with reference to time-function representations of the vehicle's speed V, the torque M of the electric machine in the transmission and the driver's indication or wish, while driving the vehicle downhill.

During a first phase I in FIG. 1, the first transmission ratio or gear is engaged and to avoid a 1-2 overdrive upshift, the negative torque M or overdrive torque from the electric machine is quantitatively increased until the driving or vehicle's speed V is approximately constant. In this way, during the downhill drive the vehicle's acceleration is reduced and this prevents the electric machine from reaching its maximum rotational speed. The quantitative increase of the negative torque M of the electric machine, or overdrive torque, can be seen from the torque variation of the electric machine shown in FIG. 2.

In a second phase II, a driver's reaction or driver's indication F at approximately constant vehicle speed V is awaited. As can be seen for example from FIG. 2, the overdrive torque at the electric machine is also approximately constant.

During the transition from the second phase II to the third phase III, a driver's indication or driver's reaction F takes place, which in the diagram of FIG. 3 is represented by the phase V. During this phase V a driver's indication F is detected, for example the driver lifts his foot off the brake pedal since he wants a smaller braking torque. This serves to trigger or carry out the traction-force-interrupted 1-2 overdrive upshift, since the overdrive torque is reduced virtually to zero as can be seen in FIG. 2. During this the speed V of the vehicle increases slightly, as shown in phase III of FIG. 1 As soon as the second gear has been engaged, in which for example the overdrive torque increases slightly in accordance with the driver's wish, phase IV begins in order to keep the vehicle's speed approximately constant.

INDEXES

V Speed of the vehicle
M Motor torque of the electric machine
F Driver's indication or torque desired by the driver
t Time
I Time phase
II Time phase
III Time phase
IV Time phase
V Time phase

The invention claimed is:

1. A method of controlling a two-speed transmission with an electric machine in a vehicle operating in negative torque, the method comprising the step of:
controlling motor torque (M) produced by the electric machine independently of a driver's indication (F) to reach an approximately constant vehicle speed (V), and
carrying out a 1-2 upshift from first gear to second gear upon detecting a driver's desire to increase the vehicle speed.

2. The method according to claim 1, further comprising the step of increasing negative torque of the electric machine, depending on the driver's indication (F), until a maximum rotational speed of the electric machine is reached.

3. The method according to claim 1, further comprising the step of carrying out the 1-2 upshift when, according to the driver's indication (F), either a smaller negative torque or a positive drive torque of the electric machine is desired.

4. The method according to claim 3, further comprising the step of initiating the 1-2 upshift if it is detected, as the driver's indication (F), that the brake pedal is being actuated by the driver less intensely.

5. The method according to claim 3, further comprising the step of initiating the 1-2 upshift if it is detected, as the driver's indication (F), that a brake pedal is no longer being actuated by the driver.

6. The method according to claim 3, further comprising the step of initiating the 1-2 upshift if it is detected, as the driver's indication (F), that the driver is not actuating the brake pedal but is beginning to actuate the brake pedal.

7. The method according to claim 1, further comprising the step of issuing a warning to the driver when a maximum rotational speed and a maximum possible negative torque of the electric machine are reached and, thereafter, initiating the 1-2 upshift.

8. A method of controlling a two-speed transmission with an electric machine during negative torque operation of a vehicle, the method comprising the steps of:
increasing a negative torque produced by the electric machine, during operation of the vehicle, to reduce vehicle acceleration and attain an approximately constant vehicle speed;
monitoring actuation of a brake pedal to determine a driver's desire to increase the vehicle speed;
detecting the driver's desire to increase the vehicle speed when actuation of the brake pedal by the driver reduces the negative torque produced by the electric machine; and
initiating a 1-2 upshift from a first gear to a second gear upon detecting the driver's desire to increase the vehicle speed.

9. The method according to claim 8, further comprising the step of increasing the negative torque produced by the electric machine, during operation of the vehicle, until a maximum negative torque of the electric machine is reached.

10. The method according to claim 9, further comprising the step of issuing a warning signal to the driver when the maximum negative torque of the electric machine is reached and, thereafter, initiating the 1-2 upshift from the first gear to the second gear.

11. A method of controlling a vehicle having an electric machine and a two-speed transmission with only two gears, and the electric machine, during operation in a negative torque mode, reducing a vehicle speed of the vehicle, the method comprising the step of:
controlling a motor torque (M) produced by the electric machine, independently of a driver's indication (F), to reach an approximately constant vehicle speed (V);
determining a driver's desire to increase the vehicle speed by detecting movement of the brake pedal by the driver; and
carrying out a 1-2 upshift, upon detecting the driver's desire to increase the vehicle speed, to increase the vehicle speed while maintaining a smooth transition from first gear to second gear.

* * * * *